No. 733,910. PATENTED JULY 14, 1903.
H. W. LADD.
ART OF DETERMINING THE NAUTICAL BEARING OF NAVIGABLE VESSELS.
APPLICATION FILED MAY 15, 1899.
NO MODEL.
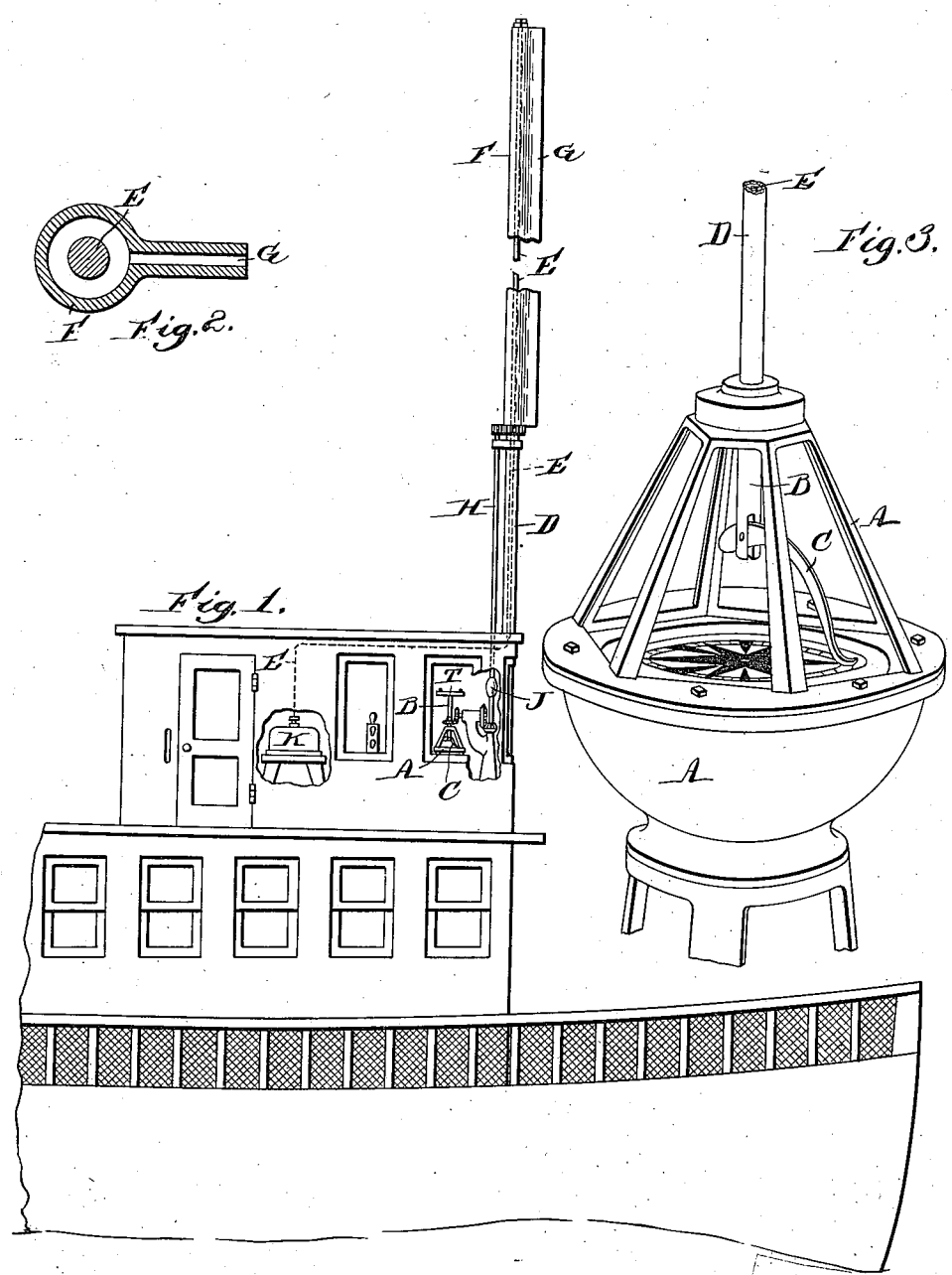
Witnesses:
Charles F. Logan
E. B. Phillips
Inventor:
Hermon W. Ladd
by A. H. Revens
Atty.

No. 733,910.         Patented July 14, 1903.

UNITED STATES PATENT OFFICE.

HERMON W. LADD, OF BOSTON, MASSACHUSETTS, ASSIGNOR TO GEORGE E. SMITH, TRUSTEE, OF EVERETT, MASSACHUSETTS.

ART OF DETERMINING THE NAUTICAL BEARING OF NAVIGABLE VESSELS.

SPECIFICATION forming part of Letters Patent No. 733,910, dated July 14, 1903.

Application filed May 15, 1899. Serial No. 716,853. (No model.)

*To all whom it may concern:*

Be it known that I, HERMON W. LADD, of Boston, in the county of Suffolk and State of Massachusetts, have invented certain new and useful Improvements in the Art of Determining the Nautical Bearing of Navigable Vessels, of which the following is a specification.

My invention is primarily an improvement in the art of determining bearings of ships for navigation under conditions such as are hereinafter set forth, the object being by means of improved indicating devices for use with a ship's compass and the usual sailing-charts to determine the bearings of known objects at a distance from the ship at times when owing to fog or storm the landmarks may be invisible.

My invention is based upon the scientific fact recently demonstrated by Marconi and others that so-called "Hertzian-wave" impulses or signals may be conveyed over long distances without connecting wires. I utilize this principle by means of suitable apparatus to determine the position of the ship with relation to known landmarks, and thus render navigation safer and avoid the delays in the movement of vessels caused by foggy or stormy weather when the usual sight observation cannot be taken. Such apparatus carried on the ship is applied to or connected with the binnacle which incloses the ship's compass, and it consists, primarily, of a receiving instrument electrically connected with an upright conductor so shielded that it can only receive the said wave, impulse, or signal (coming from a transmitting-station on shore or from another ship or light-ship) through a lateral opening or slot when such exposure is in proper range radially with said ship or shore station.

The accompanying drawings illustrate suitable means for carrying out my improved method of determining bearings. Such apparatus is not herein claimed, but constitutes the subject-matter of another application, Serial No. 56,814, filed by me as a division hereof.

As herein shown, the signaling-wave conductor E is surrounded by a rotatable shield, cap, or tube slotted vertically to admit the wave or impulse from a given station at such time only in its rotation as the slot is between said station and the inclosed conductor. With this apparatus or its equivalent I may employ a rotatable pointer extending over and close to the compass always in the same radial vertical plane as said slot or exposure to indicate on the face of the compass the bearing of the station from which emanates the signal or impulse, reaching the receiving instrument through such slot or exposure.

With my system of taking bearings each lighthouse and prominent landmark will have a distinctive name or number by which it is known and designated on sailing-charts, and each will be provided with a transmitting instrument adapted to continually repeat its name or number, or to automatically transmit such impulse, wave, or signal as shall make the identity of the station certain. Then when a ship appears off the coast provided with my receiver and compass attachments the elevated conductor receives through the slot of its rotating and intermittently-acting shield the impulse sent seaward from the transmitting-stations, and the navigator notes at once on his chart the bearing of said station as denoted on his compass-dial by the indicating-pointer. From another shore-station he receives a different signal, and by the cross-bearings thus secured he obtains his reckoning, showing exactly whereon the chart his ship should be. A transmitting instrument on the ship will at such times be able to communicate with the shore-station, thus making its presence and its exact location known.

In the drawings, Figure 1 is a representation of a part of a ship having my apparatus applied to and in the pilot-house. Fig. 2 is an enlarged cross-section of the rotatable slotted shield or cap which surrounds the conductor. Fig. 3 is an enlarged view of the binnacle with the compass and indicator inclosed therein.

A represents the binnacle which incloses the ship's compass, suspended in the usual way.

B is a vertical rotatable shaft mounted in a bearing in the top of the binnacle and extending down toward the center of the compass.

C is a radial indicating-pointer extending from the foot of shaft B outwardly to the margin of the compass-dial.

D represents a vertical supporting-tube inclosing and effectually protecting the lower part of the wave-catching conductor E, which extends upwardly to a considerable height above the ship's deck, so as to come within the sphere of influence of a wave-transmitting instrument located in a station many miles away. The tube D is permanently erected with the wave-catching conductor E stationary within it and protruding above its top. A rotatable shield or cap F is mounted on the top of the supporting and protecting tube D and surrounds the bare protruding upper end of the vertical conductor E. An elongated vertical slot G on one side of said cap admits the Hertzian or ether waves coming from the transmitters to contact with the bare conductor within the slotted shield or cap whenever in its rotation the slot comes between the conductor and transmitter. The slot G is narrow, and its walls are shown extended well out from the conductor, so that said waves, coming in direct radial lines, only reach the conductor from a point of the compass defined by the radial direction of the slot-walls, which will be the same as that denoted on the compass-dial by the indicating-pointer C.

The protecting and supporting tube D and the rotatable slotted shield F, which surround the conductor E, will be of durable material, opaque or impervious to the Hertzian waves, preferably of a reasonable thickness of copper. The relative length of the stationary tube D and the rotating shield F will be so proportioned as to secure the most effective action of the apparatus.

Any convenient means for rotating the slotted shield or cap F in unison with the arm C may be adopted. The devices shown in Fig. 1 are suitable and consist of a vertical rod H, parallel to the protecting-tube D, mounted in bearings and having a geared connection at top with the slotted shield or cap and at bottom with the binnacle-shaft B, which carries said arm. The rod H is provided with a hand wheel or ball J, by which it may be rotated by the operator, or it may be driven by any electrical or mechanical means. The conductor E extends from the slotted shield or cap F, as shown by dotted lines in Fig. 1, into the pilot-house, and the receiving instrument K records the signal received in accordance with the Marconi system.

By providing each ship with transmitting and receiving apparatus and with my rotatable devices connected to the binnacle it becomes possible for such ships to communicate with each other and also to determine from the compass of any ship during fog or storm the direction therefrom of a ship sending out signals of distress or otherwise.

I prefer to furnish with my described apparatus a sighting-tube T, Fig. 1, mounted on the binnacle-shaft B in the plane of the pointer C or parallel thereto, so as to provide also for sight observations when the weather conditions are favorable therefor.

I do not limit myself to the specific devices or the proportions or form of apparatus herein illustrated and described, for it is obvious that many changes in details may be made without departing from the spirit of my invention and within the improvement in the art herein disclosed.

I do not claim the discovery of the principle of signaling by Hertzian or ether waves without connecting wires nor, broadly, the transmission of intelligence between ship and shore or between different stations in that manner, but rather the described method by which such signals or waves emitted from points on ship or shore are received at other stations by an apparatus adapted to receive the signals or waves upon a wave-catching conductor and provided with a rotatable part by which such conductor is shielded from said waves in certain directions and exposed in the direction from which the desired waves emanate, the bearing of the transmitting station being indicated by the point of the compass from which such waves arrive when acting on said conductor.

What I claim as my invention is—

1. The method of determining the direction of motion of Hertzian signal-waves which consists in shielding an elevated conductor of a wireless-telegraph receiving-station from said waves on certain sides and exposing it to waves on one side, and in rotating the shielding element until the receiving-conductor is exposed to said waves.

2. The method of receiving Hertzian signal-waves from any one of a number of signaling-stations, to the exclusion of similar waves from other stations, which consists in shielding the elevated conductor of a wireless-telegraph receiving-station from such waves in certain directions, and exposing it in the direction from which the desired signal-waves emanate.

3. The described improvement in the art of determining the nautical bearing of navigable vessels, consisting in wirelessly transmitting so-called Hertzian-wave signals from a ship or shore station, receiving such signals on an instrument having a wave-catching conductor alternately shielded from such waves and exposed thereto, and indicating on a mariner's compass, employed with such shielding and exposing means, the nautical bearing of the transmitting-station, for the purpose set forth.

4. The improvement in the art of determining the nautical bearing of navigable vessels, consisting in the wireless transmission of so-called Hertzian-wave signals from a designated station on ship or shore, the reception of such signals by an instrument having a wave-catching conductor alternately shielded from and exposed to the action of such wave-signals by a rotary movement, and the indication on a mariner's compass and by a device connected with such alternately-acting shield and exposer of the point of the compass from which such signal was emitted, for the purpose set forth.

5. The described improvement in the art of determining the nautical bearing of navigable vessels, consisting in wirelessly transmitting so-called Hertzian-wave signals from a ship or shore station, receiving such signals on an instrument intermittently responsive and non-responsive thereto, according to the exposure of its wave-catching conductor to the influence of said waves, and indicating on a compass and chart, used with such intermittently-operating device, the ship's bearing and location, substantially as set forth.

6. In Hertzian-wave signaling, the art of determining the relative locations of a fixed and a moving, or undetermined, station which consists in wirelessly transmitting such signals from one of said stations, and receiving such signals at the other station on an instrument having a wave-catching conductor shielded from such waves in certain directions, and exposed thereto in the direction from which the desired waves emanate, the bearing of the transmitting-station being indicated by the point of the compass from which such waves arrive when acting on said conductor.

In testimony whereof I have affixed my signature in presence of two witnesses.

HERMON W. LADD.

Witnesses:
A. H. SPENCER,
JAMES A. LADD.